Patented Sept. 30, 1952

2,612,035

UNITED STATES PATENT OFFICE 2,612,035

CONTROL STATION FOR OPERATING WASHERS WITH A SINGLE BATH

Benjamin Alvin Buss, East Moline, Ill., and Hercheal Wood Miller, Davenport, Iowa, assignors to American Machine and Metals, Inc., East Moline, Ill., a corporation of Delaware Application July 3, 1947, Serial No. 758,804

3 Claims. (Cl. 68—12)

This invention relates to an automatically operated washer and to a control unit adapted to operate the washer automatically. Automatic washers have been designed to carry out a cleansing process upon metal objects, drinking glasses, bottles, dishes, or fabrics including several steps such as washing the object in solvents or detergent, rinsing, and subsequently treating the object with solutions intended to produce some desired result such as bleaching, bluing, souring, mothproofing, or the like.

Such automatic controls invariably involve establishing the values for a large number of variables that should be left to the discretion of the operator. Thus, these controls generally determine the number of each kind of step, the amount of detergent used in each step, the temperature of the water, the length of time each step is to continue, or the depth of the bath.

Such automatic controls for washing machines have not achieved wide acceptance because they have provided predetermined programs covering the entire washing operation, and did not permit the operator to vary the procedure to suit the specific requirements of each load or of local conditions.

The present invention relates to a washer that is automatic to the extent of permitting the operator to set up at a single control station all of the variables involved in a single step of the process. The automatic control will then take over and carry out that one step in accordance with the operator's selection of the variable factors, dump the spent bath and signal the operator that the washer is now ready for him to determine the variables that enter into the next step of the cleaning operation. Thus, the invention affords the advantages of automatic operation in relieving the operator from details and permitting him to attend to other duties without sacrificing his skill and ability to adapt the treatment to the condition of the particular lot of materials being treated at the instant.

While not limited thereto, one field for the invention is in the cleansing of fabrics in commercial laundries and drycleaning establishments. By way of illustration, a commercial laundry washer equipped with the invention will be described. Such washers generally have a cylinder movable about a horizontal axis into which the material is loaded, a shell surrounding the cylinder, a motor adapted to turn the cylinder a number of revolutions first in one direction and then in the opposite direction, valves for supplying hot and cold water, sometimes valves for supplying steam, and an outlet for draining off the spent bath. If such a washer is equipped with the automatic control as herein described, the operator is still able to decide how long he wants to agitate the clothes, the type of supplies he desires, the temperature he desires, and the water level which he wishes to carry. Having determined these factors, the machine will automatically close the dump valve, fill the washer to the level desired with water of the proper temperature, turn the washer in one direction the required number of turns, then reverse, operate for the desired number of minutes, open the dump valve allowing the water to drain off, and signal the operator that the machine is ready for the next step.

By contrast, when the operator carries out a number of steps in the present commercial washer in the customary manner, he proceeds as follows:

He closes the dump valve located in the center of the washer with his foot, he moves to one end of the machine and part way opens the hot water valve, then part way opens the cold water valve. He has no means of telling to what extent to open each valve. He sets the float for the depth of bath he desires. He loads the machine with clothes, closes the doors, and goes to the other end of the machine to push the button to start the driving mechanism. When the proper depth of water is reached, the valves shut off automatically, but the operator must stay around to see whether he has guessed the right degree of opening of the two inlet valves. He does this by reading the thermometer, and, if the temperature is not what he wishes, he stays by the steam valve until the bath has reached the proper temperature. He is now free to attend his other duties but he must remember to return to the machine at the expiration of five minutes or whatever time he wishes the machine to run. He then returns and opens the dump valve. He must either stay at the machine for the next minute while the water is draining through the dump valve or else return in this short span of time to close the dump valve and start it on its next cycle. It is obvious that the operator's time is broken up so badly in serving a single washer that it is difficult for him to divide his time between several washers each of which is carrying out a different step in its washing cycle. Confusion and bad work frequently result.

Where one operator cares for three or four washers and must load and unload one or the other of them every fifteen minutes, it is clear that his duties at the several machines overlap and that it is difficult for him to be at each washer at the time when the next thing should be done and he is apt to forget how many cycles have already been performed on the particular machine and what is the next step which should be done.

The object of the invention is to enable the washman to determine all the factors entering into a single step of the washing operation at one time leaving it to the washer to automatically carry through the entire step.

A further object is to enable the operator of a laundry washer to select the temperature, the depth of bath, the length of run, to put his detergent into the washer, and to permit the machine to automatically supply the proper amount of hot and cold water, add steam, if necessary, after the proper depth of water has been reached, run for a set period, open the discharge valve, and light a signal light.

A further object of the invention is to combine all the control apparatus at one point of the washer shell giving a single operating station.

A further object of the invention is to provide a control apparatus wherein the dump valve will automatically close when water is turned into the washer.

A further object of the invention is to provide an electrical control unit determining the sequence of all of the above functions which may be readily disconnected from the washer and replaced by another unit in the event of failure.

A further object of the invention is to provide a control unit for an automatic washer having a single control knob having an off position in which all current is disconnected and the machine at rest, a zero position reached by turning the knob in one direction which places the washer cylinder in operation, and an unloading position reached by turning the knob the opposite direction from the off position. When the knob is turned to unload, the motor turns the washing cylinder to a position where its door and the shell door are aligned ready for loading or unloading whereupon the machine stops.

A further object of the invention is to provide a control unit for an automatic washer having a single control knob having an off position in which all current is disconnected and the machine at rest, a zero position reached by turning the knob in one direction which places the washer in operation, operating positions reached by turning the knob in the same direction beyond the zero position at which the knob will cause water to be admitted to the cylinder and a timing mechanism started that gradually turns the knob back to its zero position whereupon the shell is automatically drained.

The invention involves the opening of inlet valves, closing them subject to temperature or water level, opening and closing a dump valve automatically and at the proper time. This may be accomplished by any suitable type of timing mechanism and any suitable servo mechanism which will cause the valves to be moved at the proper time. Mechanical, hydraulic, pneumatic, or electrical means might thus be employed. In the preferred form here illustrated, the automatic control controls certain electric circuits which in turn actuate valves through solenoids.

Figure 1:
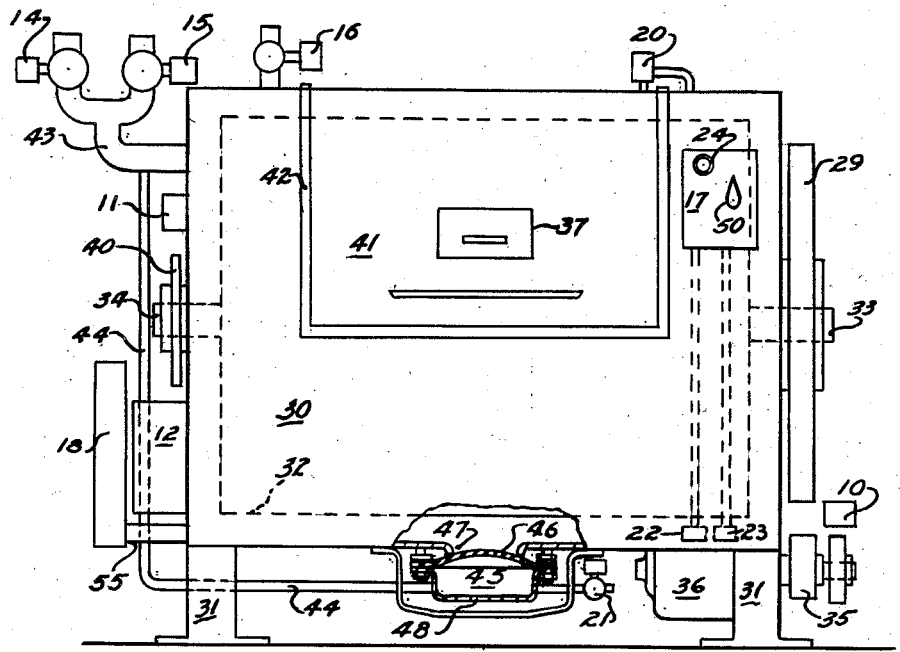
Fig. 1 shows a commercial laundry washer to which the invention has been applied and the control box mounted thereon.

The washer shown in Fig. 1 has the usual outer shell 30 supported on stationary legs 31. Within this shell, shown in outline, is the usual cylinder 32 supported on shafts 33, 34. The shaft 33 carries a pulley 29 which is adapted to be driven by a belt (not shown) from the driving pulley 35 on the shaft of the motor 36. The motor is equipped with the customary spring applied brake, diagrammatically indicated, which is released when current is supplied to the solenoid 10. Shaft 34, located at the other end of the cylinder, carries a cylinder orienting device which is adapted to stop the cylinder in proper unloading position. This device, more fully described in Letters Patent 2,479,153 granted to Alvin Buss August 16, 1949, comprises a cam 40 and an electrical control unit 11 actuated by the cam. The cylinder cam engages the control at every revolution but normally the control circuit through the control is not connected to a source of power. When the cylinder is to be stopped, moving the knob 50 to the unloading position does not stop the machine but energizes electrical control unit 11. This is so designed that it responds to the cam only when the cam and the cylinder are turning in the direction which will bring the load toward the door and the current will be shut off from the motor and the brake applied in such manner that the cylinder will be oriented with the door in the cylinder in line with the door in the shell for convenient unloading. A the left hand end of the shell 30 is a motor control box 12 which contains the switches for starting, stopping and reversing the electric motor 36. A cylindrical well 18 is connected to the shell by a tube 55. The water level in the well 18 is the same as that in the shell.

The washer shell is equipped with a sliding door 41 which slides in guides 42. When the door is closed, a switch 20 supported on the shell and interlocked with the control circuit is also closed. The washer has hot and cold water inlet pipes controlled by solenoid valves 14, 15 each operated by an electric solenoid. Water passing through either of these two valves enters the shell through a manifold 43. A pipe 44 branching from this manifold supplies a column of water to hydraulically close the dump valve whenever water is admitted to the washer.

The shell 30, as indicated in the broken away portion in Fig. 1, has a bottom flange 47 through which water may be drained out of the shell. Below the diaphragm is a housing 48 suspended from the washer. This housing carries the diaphragm 46 which is adapted to close the opening 47. This diaphragm is flexed upward to close the shell opening when water is supplied through connection 44 to the space 45, and this shell opening is opened when the solenoid-operated valve 21 allows the water to drain from the housing 48 whereupon the diaphragm 46 collapses. Whenever water is admitted through either solenoid valve 14 or 15 to the shell, the pipe 44 is filled, and there being no escape for the water, the housing remains filled until such time as the solenoid valve 21 is actuated.

The washer is equipped with a thermostat 23 having a bulb in the bottom of the shell. The contents of this bulb expand responsive to the temperature of the bath through tube 56 and expand the Sylphon 57.

Means for selecting the temperature of the bath without moving from the control station are provided. These may comprise an adjusting screw 58 in the switch 59 housed in the cabinet 17.

When the Sylphon expands, it lifts rod 60 which bears against the end of adjustable screw 58 and lifts the switch 59, when the desired temperature of the bath is reached which will cause the switch 59 to break the circuit 61 and make the new circuit 62. A second thermostat 22, similar to the one just described, may be provided to control the admission of steam to the bath in the event that the water bath in the washer has not reached the desired temperature when the circuit to the water supply valves have been cut off. The thermostat 22 connects with tube 63 leading to Sylphon 64. When this expands, it lifts rod 65. This bears against adjustment screw 66 in the switch 67. When this switch opens, it breaks the circuit 68.

Figure 2:
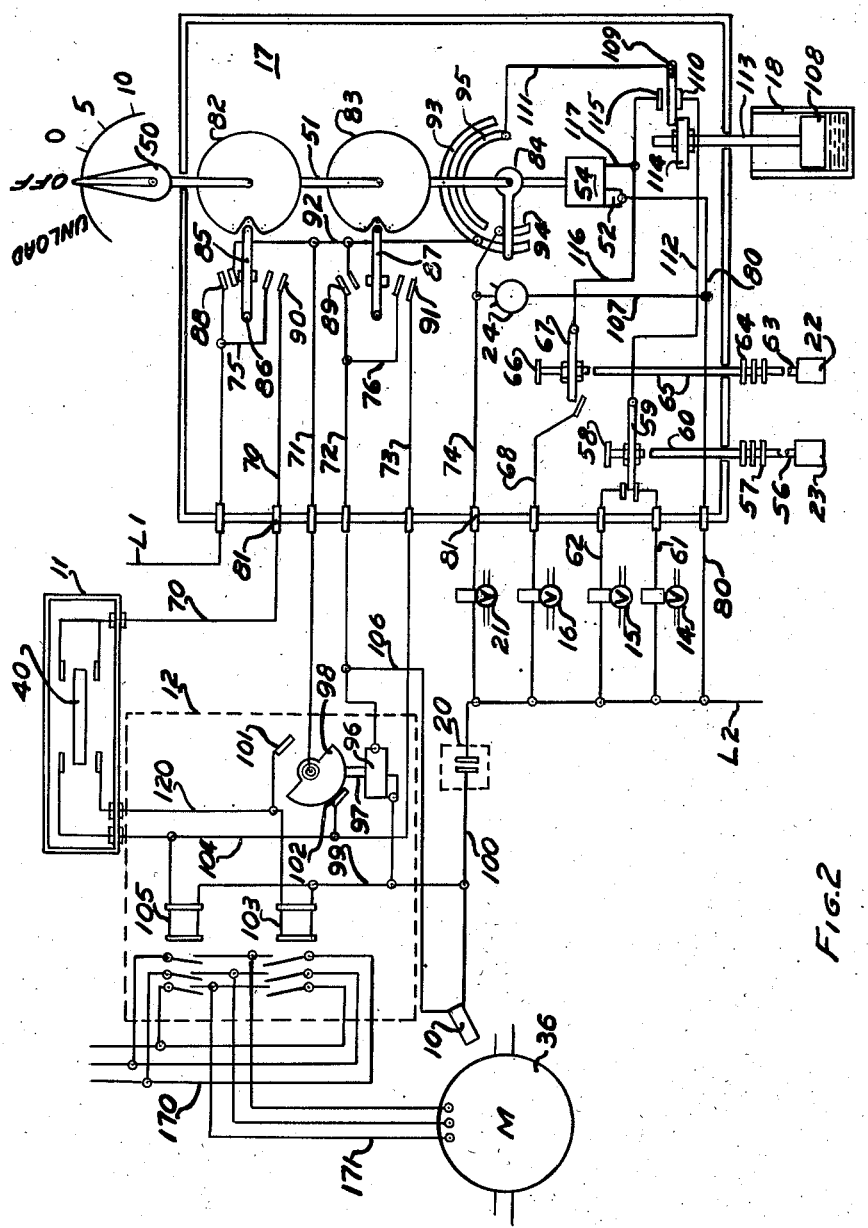
Fig. 2 is a diagrammatic showing of the control circuits.

The control panel 17 contains a number of switches and has on its front side a single knob 50. By the selection of the proper position for this control knob, all of the functions of the washer during one washing step are controlled. The control panel is shown in Fig. 2 and it will be noted that all of the electrical connections with the rest of the apparatus are through lines L-1, 70, 71, 72, 73, 74, 80. The box 17 may be provided with a series of contacts 81 which permit lifting the entire unit 17 off the washer and replacing it by another in the event of failure.

Knob 50 is shown in the "off" position. It is attached to the shaft 51 which carries a series of cams 82, 83 and a finger 84. This shaft is at times moved by hand through knob 50 and at other times the knob is turned in counter-clockwise direction by a timer motor 52 driving through a speed reducer 54. This arrangement permits the shaft 51 to carry the finger 84 through a wide angle in either direction without affecting the switches just described some of which remain closed after the initial movement of the knob.

When the cam switch lever 85 pivoted at 86, is in the "off" position shown in Fig. 2, both contacts 88 and 90 are open. In another position of the switch lever, contact 88 is closed, while in the third position, the contact 88 is open and contact 90 is closed. When the knob 50 is turned to the right, contact 88 is closed which supplies current to line 92. The shaft 51 carries another cam 83 which moves switch lever 87. When the knob 50 is turned clockwise, as previously described, the switch lever will close the contact 89, while, if it is turned counter-clockwise, it will close the contacts 91. It thus appears that turning the knob 50 to the right will permit current to flow from line L-1 through contacts 88 or line 92 to line 71 and also through contacts 89 to line 72.

The shaft 51 also carries a finger 84 which is in contact with arc 93 which in turn is connected with line 92. This finger serves to connect the arc 93 with the contact 94 when the knob is either in the "off" or "zero" position. In the other positions, the finger connects the arc 93 with the arc 95.

The circuit 72 leads into control box 12 and drives the reversing timer motor 96. This timer motor turns a shaft 97 that carries a cam 98 which determines when the direction of the motor 36 shall be reversed. The motor is reversed to alternately turn the cylinder 32 in one direction or the other. This is done in conventional practice to prevent the clothes from tangling. In order to complete the circuit through the reversing timer motor 96, the current must pass through lines 99, 100, then through switch 20 to line L-2. If the washer door 41 is not closed, the switch 20 remains open, and the washer cylinder cannot start. Current also flows through line 71 to the cam 98 which is continually revolved by the timer motor 96 in one direction. This cam 98, covering roughly a half circle, will be in contact either with finger 101 or finger 102. Finger 101 connects with solenoid 103 and line 99 to L-2. This closes the switch that connects the 3-phase power line 170 through the three leads 171 to power motor 36. If, on the other hand, the cam 98 is in contact with lead 102, current will pass through line 104 to solenoid 105 and then through line 99 to switch 20 to circuit L-2. The 3-phase circuit 170 is now connected to leads 171 to reverse the rotation of the motor 36. The timer thus periodically reverses the direction of rotation of the cylinder.

A branch 106 from line 72 passes through brake release solenoid 10 disengaging the motor brake while the motor is driving the washer. When the knob moves from the "off" to the "zero" position, the finger 84 continued to remain in contact with the small arc 94 thus permitting current to flow through line 92, arc 93, finger 84, arc 94, and line 74 through the dump valve release solenoid valve 21 and thence to L-2. As indicated in Fig. 1, the opening of the solenoid valve 21 allows the water to drain from the chamber 45, and the diaphragm then collapses leaving an opening in the shell 30 to drain out the contents. Once the water has been drained out, the water dump valve remains open even though the finger 84 passes beyond the arc 94. The valve is closed when water passes through the manifold 43. A part of the water flows through line 44 into space 45 and the head of water holds the dump valve shut.

The automatic opening of the dump valve when the knob 50 is in the "zero" position is an important feature in the operation of the unit. Whenever the washer has been filled with water and either solenoid valve 14 or 15 is opened, the pipe 44 is filled with water and the dump valve is closed. Also, if there be leakage in the valves, the washer might have accumulated water while standing idle. Thus, it appears that as the operators moves the knob to the right from the "off" position, he must necessarily drain the shell. Likewise, when the knob is returned from one of the positions marked in minutes by the timer to the "zero" position at the completion of a step, the dump valve is opened automatically. In parallel with the circuit 74 is the circuit through pilot light 24 on the face of the control box housing 17 and line 107, line 80, circuit L-2. It thus gives a visual indication when the dump valve is opened. As the operator moves the knob clockwise beyond the "zero" position to one of the positions numbered in minutes, the finger 84 leaves the arc 94 and passes on to the arc 95. This arc 95 then supplies current for operating the inlet valves to fill water into the shell, and when the proper water level has been reached, for adding steam, if it is necessary to bring the water up to the desired temperature, and also providing current to drive the small timer motor 52. As the finger 84 leaves arc 94, the solenoid-controlled valve 21 closes so that any water coming through line 44 may act to close the diaphragm. The shell is now empty, float 108 in its lower position, and the switch 109 is in the position shown resting on contact 110. Under normal conditions, the temperature control switch 59 is in the position shown closing circuit 61. Thus, current will flow from the arc 95 through line 111, switch 109, contact 110, line 112, switch 59, line 61, through the hot water inlet, solenoid valve 14 to line L-2.

Hot water now flows through solenoid valve 14, manifold 43, into the shell, and comes in contact with thermostat 23. If the temperature of the hot water is higher than the temperature desired, the thermostat 23 will move the switch 59 to break the connection with circuit 61 and make a new connection with circuit 62. This new circuit 62 passes through the cold water solenoid valve 15 into line L–2. The hot water valve now closes, the cold water valve opens, and as the cold water flows through manifold 43 into the pool at the bottom of the shell, the thermostat 23 shifts the switch 59 back to circuit 61. Thus, the solenoid water valves 14, 15 open alternately if the temperature selected is between that of the hot and cold water supply lines. While this has been going on, the water level has been rising and finally the float 108 having stem 113 which carries an adjustable collar 114 lifts switch 109 and closes a contact 115 thus breaking off circuit 112 that leads to both the hot and cold water valves.

When the switch 109 is moved by the float 108, a new circuit flows through contact 115, line 116, to thermo-switch 67, line 68, and the steam-controlling solenoid valve 16 to L–2. If the hot water was sufficient to elevate the water in the bath to the desired temperature, thermostat 22 has already opened the swicth 67 so that no current flows through the solenoid controlling the steam valve. Should the temperature of the hot water have been insufficient, the flow of steam continues long enough to elevate the water temperature to the point where the switch 67 opens. A branch 117 extends from line 116 to the timer motor 52, thence through line 80 to L–2. The timer motor is now slowly turning the knob 50 back from the position to which the operator has advanced the knob to the position marked "zero." When that is reached, the finger 84 will have left the arc 95 and engages the arc 94. That puts the timer motor 52 out of commission and again supplies current to the solenoid valve 21 that opens the dump valve.

Soap is supplied through the door 37 by the operator at the time he sets knob 50 for the time he wishes the machine to run. Similarly, bluing in the bluing cycle.

The operation of the washer during a typical cycle will now be described. With the knob 50 in the "off" position shown, the operator opens the door 41 and adjusts the thermostats by turning screws 58 and 66 so that the thermostats will act at the desired water temperature. The operator places the proper quantity of clothes in the cylinder 32 through the open door of the shell 30 and the corresponding open door of the cylinder (not shown). The cylinder door and shell door 41 are now closed which closes safety switch 20. The operator turns the knob 50 to the right to indicate the number of minutes he wishes the machine to operate. The collar 114 on the float 108 has been adjusted to open the switch 109 when the desired water level is reached. This will shut off all inlet valves. Before leaving the machine, the operator places detergent, bluing or solvent in the machine. The operator may now proceed with his other duties and the automatic control takes over. If the operator has turned the knob to read five minutes, the circuit already described causes the washer cylinder 32 to turn a number of times in one direction whereupon the direction is reversed. A hot water solenoid valve 14 has been opened and water flows in.

Immediately some of the water flows through line 44 into space 45, elevates the diaphragm 46 and closes the outlet 47, the hot water flowing into the shell forms a pool. When the temperature of the pool exceeds the value selected by screw 58, the thermostat-controlled switch 59 opens shutting off the further supply of current to the hot water solenoid valve 14. At the same time, switch 59 closes the circuit to cold water solenoid valve 15. When the temperature of the pool has been brought down, the switch 59 will again shift and add hot water. Thus, switch 59 continues to open and close the hot and cold water valves until the desired water level is reached whereupon switch 109 opens and no more current is supplied to either the hot or cold water valves. If the temperature is not yet up to that selected by the operator, the mechanism causes the second thermostat 22 to provide steam as long as necessary to get the temperature selected by screw 66. Not until the proper water level has been reached does the timer motor 52 start thus giving the load the full period of agitation in the depth of the bath selected by the operator. When the washer has run the proper length of time, timer motor 52 will have brought the knob back to the "zero" position. This causes the pilot light 24 to light and the dump valve to open because drain solenoid valve 21 is opened.

The operator repeats this procedure for as many cycles as are necessary to give the desired number of suds, rinses and bluing and souring and other treatments.

It will be noted that thus far the washer has never stopped running. After the completion of the last cycle, the operator turns the knob 50 through the "off" position to the "unload" position. In passing through the "off" position all circuits become dead for a moment because the finger cam 82 swings switch lever 85 into "off" position cutting off L–I, the power source. However, as the knob moves past the "off" position, cam 82 is swung far enough to close contact switch 90. Similarly, switch lever 87 now closes contacts 91. Current now flows from L–I through line 75, contact 90 and line 70 to the orienting device 11 where the cam 40 supplies current either to lines 104 or 120 leading to solenoid switches 105 or 103 controlling the rotation of the washer until the washer comes to rest with the cylinder door aligned with the shell door. Then cam 40 is out of touch both with line 120 and 104. The orienting mechanism is the subject of Patent 2,479,153, granted August 16, 1949.

As explained in that application, it is desired to apply the brake to the motor while the washer cylinder is turning in one direction during the orienting period to prevent coasting. This is the direction in which the washer turns when the cam 40 causes solenoid 103 to be energized. It is, however, desired to release the brake while the cylinder is turning in the other direction. This is the direction of rotation governed by energizing solenoid 105. To permit this release of the brake, contacts 91 in the control box are provided. When the control knob 50 is turned to the "unload" position, current can flow through the brake releasing solenoid 10 when solenoid 105 is actuated. Current then flows from L–I through line 75, contacts 90, line 70, cam 40, line 104, line 73, contacts 91, line 76, line 72, line 106, brake release solenoid 10, line 100, switch 20, to L–2.

The invention is not limited to laundry washers or to precise details of operation here used by way of illustration.

We claim:

1. In a laundry washing machine of the character described having power operative components including a motor driven tumbling cylinder and a dump valve for draining the machine, the combination of, means for controlling the motor and the dump valve for each single operation of the machine so as to continue operation of the motor after the dump valve is opened whereby the laundry continues to tumble and lose soil and liquid comprising, manually adjustable means having an "off" position wherein all operative components of the machine and the control means are disconnected from power and an active timing range including a "zero" position wherein all operative components except the motor are disconnected from power, timing means set by said manually adjustable means in said timing range always for operation back to said "zero" position from selectable other positions, first switch means operated by said manually adjustable means for energizing the motor when said manually adjustable means is moved away from the "off" position to any other position, and second switch means automatically operated by said timing means for simultaneously disabling said timing means and opening the dump valve when said timing means returns to the "zero" position.

2. In a laundry washing machine of the character described having power operative components including a motor driven tumbling cylinder and each dump valve for draining the machine, the combination of, means for controlling the motor and the dump valve for a single operation of the machine so as to continue operation of the motor after the dump valve is opened whereby the laundry continues to tumble and lose soil and liquid comprising, manually adjustable means having an "off" position wherein all operative components of the machine and the control means are disconnected from power and an active timing range including a "zero" position wherein all operative components except the motor are disconnected from power, timing means set by said manually adjustable means in said timing range always for operation back to said "zero" position from selectable other positions, first switch means for energizing the motor when said manually adjustable means is moved away from the "off" position to any other position, and second switch means for disabling said timing means and simultaneously opening the dump valve when said timing means returns to the "zero" position, said first and second switch means being operatively attached to said manually adjustable means and said timing means.

3. In a washing machine having a shell for containing a bath and having power operative components including, water supply means for providing said bath, automatic means for controlling the level and temperature of said bath, a dump valve for draining said bath from said shell, a rotatable cylinder in said shell for tumbling a load of laundry into and out of said bath, and motor means for rotating said cylinder, the combination of, control means for simultaneously operating said dump valve and said motor means for maintaining rotation of said cylinder after opening said dump valve comprising, manually settable means having an inactive position wherein all operative components of the machine and the control means are disconnected from power and an adjustable timing range comprising any number of positions providing time units from a predetermined maximum to a "zero" position, a timing motor for moving said settable means only in said range in only one direction from any preselected position back to said "zero" position wherein all operative components are disconnected from power except for the cylinder driving motor, first switch means controlled by said manually settable means for causing said motor means to rotate said drum when said settable means is in said timing range including the "zero" position, second switch means operated by said timing motor for simultaneously disabling said timing motor and opening said dump valve to drain said bath when said settable means returns to said "zero" position, and third switch means in circuit with said second switch means and controlled by the automatic means for controlling the level of the bath for preventing operation of said timing motor when the bath is below a predetermined level, said parts being constructed and arranged so that said drum continues to rotate and tumble the laundry to remove water and soil therefrom after said dump valve is opened.

B. ALVIN BUSS.
H. WOOD MILLER.

REFERENCES CITED

The following references are of record in the file of this patent:

UNITED STATES PATENTS

| Number | Name | Date |
|---|---|---|
| 1,103,756 | Gebhardt | July 15, 1914 |
| 1,179,537 | Mapel | Apr. 18, 1916 |
| 1,940,549 | Jones | Dec. 19, 1933 |
| 1,954,261 | Pierce | Apr. 10, 1934 |
| 2,064,053 | Balzer | Dec. 15, 1936 |
| 2,195,615 | Chamberlin et al. | Apr. 2, 1940 |
| 2,258,360 | Hetzer | Oct. 7, 1941 |
| 2,305,154 | Gilbert | Dec. 15, 1942 |
| 2,346,259 | Hutchings | Apr. 11, 1944 |
| 2,425,788 | Edwards | Aug. 19, 1947 |
| 2,430,668 | Chamberlin | Nov. 17, 1947 |
| 2,479,153 | Buss | Aug. 16, 1949 |
| 2,498,885 | Geldhof et al. | Feb. 28, 1950 |